United States Patent [19]

Murray et al.

[11] 4,418,084

[45] Nov. 29, 1983

[54] NEUTRAL PROTEIN BEVERAGE

[75] Inventors: Edward D. Murray, Winnipeg; Brenda J. Woodman, Port Hope; Terrence J. Maurice, Colborne; Robert R. Sirett, Cobourg, all of Canada

[73] Assignee: General Foods Inc., Don Mills, Canada

[21] Appl. No.: 14,657

[22] Filed: Feb. 23, 1979

[30] Foreign Application Priority Data

Mar. 21, 1978 [CA] Canada ................................. 299433

[51] Int. Cl.³ ............................ A23J 1/12; A23J 1/14
[52] U.S. Cl. .................................... 426/250; 426/650; 426/656; 426/590; 426/598
[58] Field of Search ............... 426/431, 656, 657, 436, 426/437, 598, 590, 456, 459, 460, 462, 655, 250, 650; 260/123, 123.5, 112 R; 252/351

[56] References Cited

U.S. PATENT DOCUMENTS

| | | | |
|---|---|---|---|
| 2,331,619 | 10/1943 | Morse | 260/123.5 |
| 2,377,624 | 6/1945 | Gordon | 260/112 R |
| 3,758,452 | 9/1973 | Owen | 426/656 |
| 3,870,801 | 3/1975 | Tombs | 260/112 R |
| 4,043,990 | 8/1977 | Melachouris | 426/590 |
| 4,071,635 | 1/1978 | Lindl | 426/656 |
| 4,143,174 | 3/1979 | Shah et al. | 426/599 |
| 4,169,090 | 4/1979 | Murray et al. | 260/112 R |

OTHER PUBLICATIONS

"Casein and Its Industrial Applications" by Sutermeister and Browne, Rheinhold Publ. Corp., N.Y., 1939, pp. 68-71.
"Soybean or Vegetable Milk-A Resume and Biblography" by Smith & Beckel from *Chemical Eng. News*, vol. 24, No. 1, Jan. 10, 1946, pp. 54-55.
"The Condensed Chemical Dictionary", 8th Ed. by Hawley, 1971, p. 162.
"Chemical Analysis of Foods and Food Products" by Jacobs, 3rd Ed., 1960, p. 256.

*Primary Examiner*—William F. Smith
*Attorney, Agent, or Firm*—Sim & McBurney

[57] ABSTRACT

A substantially neutral aqueous protein dispersion is provided having many of the characteristics of cow's milk, such as, stability, good taste and low viscosity, and also possessing superior properties in respect of protein concentration. The dispersion is formed from a protein micellar mass from various source proteins. The protein micellar mass preferably is provided in a dry buffered powder form containing one or more buffering agents sufficient to impart the required substantially neutral pH upon dispersion. The aqueous dispersion may be in the form of a milk substitute or in a variety of other hot and cold beverage formulations.

7 Claims, No Drawings

NEUTRAL PROTEIN BEVERAGE

The present invention relates to protein beverages.

The most common protein beverage is cow's milk. Cow's milk has many desirable properties, for example, it has a useful level of protein (about 3.5 to 4.0% w/v), that is of good nutritional quality, it is stable against protein separation, it has good taste and mouthfeel and has a substantially neutral pH.

Attempts have been made in the past to provide simulated milk beverages from a variety of protein materials, such as, soy, whey and fish protein concentrates or isolates, but generally these attempts have achieved only limited success for a variety of reasons, including the inability to maintain protein in a dispersed state at higher than very minor concentrations (about 1 to 1½% w/v) of protein, so that emulsifiers and dispersing aids along with partial hydrolysis have been attempted to increase the dispersed concentration of protein. However, these procedures have met with only limited success, with the procedure itself introducing new problems, for example, high viscosity and adverse flavor.

In accordance with the present invention, there is provided an aqueous protein dispersion which has many properties in common with cow's milk, some properties superior to cow's milk and does not suffer from the prior art problems of simulated milk products including those of low protein levels, poor dispersibility and objectionable taste.

The aqueous protein dispersion of this invention is provided by dispersing in water a protein micellar mass which may be in wet or dried form. Protein micellar mass is a unique protein isolate, the production of which from various protein sources is described in detail in copending Canadian patent application Ser. No. 262,397.

The protein isolate product contains at least about 90% by weight of protein (as determined by Kjeldahl nitrogen $\times$ 6.25) and is formed by settling the solid phase from an aqueous dispersion of protein micelles consisting of amphiphilic protein moieties and formed from at least one protein source material.

The procedure described in Canadian patent application Ser. No. 262,397 involves a controlled two-step operation, in which, in the first step, the protein source material is extracted with an aqueous food grade salt solution at a temperature of about 15° to about 35° C., a salt concentration of at least 0.2 ionic strength, generally about 0.2 to about 0.8 and a pH of about 5.5 to about 6.5 to cause solubilization (or salting-in) of the protein, usually in about 10 to about 60 minutes, and, in the second step, the aqueous protein solution is diluted to decrease its ionic strength to a value less than about 0.1.

The dilution of the aqueous protein solution, which may have a protein concentration, for example, up to about 10% w/v, causes association of protein molecules to form an aqueous dispersion of highly proteinaceous micelles consisting of amphiphilic protein moieties which settle in the form of an amorphous highly viscous, sticky, gluten-like micellar mass of protein having a moisture content of about 60 to about 75% by weight. The protein micellar mass so produced is referred to herein as PMM. The PMM exhibits a functionality not exhibited by the source material nor by an isoelectric isolate of that material. The wet PMM may be dried to a powder for use in that form. Drying of the wet PMM may be achieved using any convenient drying technique, such as, spray drying, freeze drying or vacuum drum drying.

The dried powder form of PMM is the most useful for this invention. As is outlined in more detail below, in one preferred embodiment other components of the dispersion are incorporated into the wet PMM prior to spray drying.

The protein micelles which are formed upon dilution of the protein solution consist of amphiphilic protein moieties. Such protein micelles are different from known micelles of other types. Lipid micelles are known but there is a limit to the extent to which lipid molecules may grow or associate because of electrostatic repulsive charges which are large relative to the hydrophobic attractive energy of these species. Further, casein micelles found in milk are strongly dependent on ionic forces.

In view of the prior art difficulty of the formation of stable dispersions from conventional proteins, it is surprising that stable dispersions of PMM are readily formed at substantially neutral pH values without the necessity of emulsifiers and suspending aids and that high concentrations of protein may be present in such dispersions.

The compositions of this invention are provided in "dilute" form, "concentrate" form, or in "dry" form. By the term "dilute" is meant an aqueous protein dispersion which is ready to drink, by the term "concentrate" is meant a concentrated aqueous protein dispersion requiring dilution with water prior to drinking, and by the term "dry" is meant, a solid mixture of components which, when dissolved and dispersed in a suitable volume of water, provides a dilute ready-to-drink protein dispersion.

The ability to utilize large quantities of protein in this invention enables beverages of significant nutritional value to be provided. By "significant nutritional value" is meant a significant proportion of the daily allowance of protein recommended by governmental health authorities.

The pH value of the dispersions of this invention is achieved using various buffering agents in association with the PMM. The pH value of the dispersions varies upwardly from about 6.2 to a value above which the alkalinity becomes objectionable for taste or digestive reasons, for example, at about pH 8.0. It is preferred for the pH to be in the range of about 6.7 to about 7.1. The lower limit of pH of about 6.2 is chosen since the dispersions exhibit instability below this value.

The range of protein concentration present in the dispersion may vary widely and may even by as high as 75% w/v. The concentrations of protein which can be achieved in this invention are extremely high in comparison to other aqueous protein compositions, for example, cow's milk which has a protein concentration of about 4% w/v. It is generally preferred to utilize a protein concentration in the range of about 4 to about 18% w/v, more preferably about 4 to about 12% w/v.

The aqueous dispersions even at the high protein concentrations are stable against protein separation, so that the composition may be provided in a syrup of concentrated form, if desired, for later dilution to the final concentration. By "stable" with respect to the protein dispersions of this invention, is meant that, in the absence of emulsifiers and conventional stabilizers, the protein phase remains wholly dispersed in water and does not settle or separate from the aqueous phase upon standing at refrigeration temperatures (about 5° to 10°

C.) for a period of several days, typically 2 to 3 days, and resists separation by centrifuging at room (about 20° to 25° C.) and refrigeration temperatures.

It is also of significance with respect to the utility of the products of this invention that certain of the compositions also are stable and resist coagulation at the elevated temperatures which are encountered in various hot water-based beverages, such as, tea, some coffee products and hot chocolate, and do not separate during the drinking time of such hot beverages. The compositions which are suitable for hot beverage use are those provided from PMM's having high coagulation temperatures as determined by differential scanning calorimetry, typically using a DuPont Instrument Model 900. High coagulation temperatures may be a function of the starting material and/or subsequent processing.

The presence of the dispersed protein in the compositions of the invention increases the viscosity of the aqueous phase to an extent which increases with concentration. Nevertheless the viscosity of the compositions of the invention is often less than that of cow's milk, even at substantially higher protein concentrations and hence does not approach the objectionable levels attained in the prior art when emulsifiers and stabilizers are used to maintain protein in suspension.

In some instances, it may be necessary to thicken the compositions of the invention to provide a viscosity similar to that of cow's milk using conventional thickening agents, such as, various gums and/or carbohydrates.

The compositions of the invention have a very bland taste which is not at all objectionable, even at high protein concentrations and which is quite similar to that of cow's milk. The objectionable taste characteristic of aqueous compositions based on conventional protein materials, such as, soy, whey and fish protein concentrates or isolates, are entirely absent from the compositions of the present invention.

The preferred manner of formation of the compositions of this invention involves the addition of one or more food grade buffer compounds to wet PMM formed by the procedure of Canadian application Ser. No. 262,397 mentioned above and usually having a pH of 5.8 to about 6.2. The buffer is added in an amount sufficient to provide with the PMM the desired pH values in the final beverage composition. The buffer compounds and the wet PPM then are thoroughly mixed to homogenize the components of the mixture and the uniform mixture is dried to yield a buffered dry PMM powder. Alternatively, the one or more food grade buffer compounds may be dry mixed in appropriate quantity with the dry PMM to form the buffered dry PMM powder.

The buffered dry PMM powder formed by either of these techniques may be stored in this form for long periods without degradation and forms one embodiment of this invention. The buffered dry PMM powder is dispersed in water when the aqueous dispersion is desired. The buffered powder rapidly disperses in the water, even at high protein concentrations, often in less than 60 seconds and usually in about 20 to 30 seconds.

The presence of buffer components in the aqueous dispersions of this invention has been found to have no adverse taste effect and does not destabilize the system. A wide range of buffering agents may be used, the choice and concentration depending on the pH desired.

The protein itself forms one part of the buffer system, and one or more other buffer compounds are included. Buffer compounds suitable for such inclusion generally are phosphates of various types and combinations of phosphates and citrates. Typical examples of single buffer compounds are tetrasodium pyrophosphate, sodium tripolyphosphate, trisodium phosphate and sodium hexametaphosphate. Typical examples of combinations of buffer compounds are sodium hexametaphosphate and trisodium citrate, sodium hexametaphosphate and tetrasodium pyrophosphate, sodium pyrophosphate and trisodium citrate and disodium phosphate and tetrasodium pyrophosphate.

In a preferred embodiment of the invention, about 0.05% w/v each of sodium hexametaphosphate and tetrasodium pyrophosphate are used as the buffer system with the PMM to provide a pH of about 7.1.

Since the manner of formation of the aqueous dispersions of this invention involves the use of mild conditions, the dispersed protein is essentially in an undenatured condition, as determined by calorimetry. This state contrasts markedly with the proteins which are prepared by various alkali/acid and/or enzymatic treatments and contributes significantly to the differences in taste characteristics.

The aqueous dispersions of this invention also may form the base composition for a range of flavored beverages. The flavoring and coloring agents and/or sweeteners required for the desired flavored beverage conveniently may be incorporated into the buffered dry PMM to provide a dry mix for later dispersion to form the flavored beverage or may be added directly to the aqueous dispersion, as desired. The quantities of such materials depends on the beverage desired.

The protein dispersion of this invention, therefore, provides a ready method of incorporating protein into the diet at protein levels at least equal to that of cow's milk and may even be as high as beef steak (about 18% w/w), if desired.

The protein source from which the wet PMM is formed may vary widely and includes plant proteins, for example, starchy cereals, such as, wheat, corn, oats, rye, barley and triticale, starchy legumes, such as, field peas, chickpeas, fababeans, navy beans and pinto beans, and oil seeds, such as, sunflower seed, peanuts, rapeseed and soy beans; animal proteins, such as, serum proteins; and microbial proteins, i.e. single cell proteins. Preferably, the protein source is a plant protein, owing to the readily available nature of the materials.

While a PMM from on protein source only usually is employed, it also is possible to use mixtures of PMM's from different protein sources, thereby achieving amino acid complementation, which is of considerable nutritional importance.

The invention is illustrated by the following Examples.

EXAMPLE 1

This Example illustrates the formation of peanut PMM.

A peanut concentrate was added in an amount of 15% w/v to an 0.6 M sodium chloride solution at a temperature of about 25° C. The pH of the solution was adjusted to about 5.8 with 1 N HCl. The mixture was stirred for about 30 minutes after which the extract was centrifuged and the sediment discarded. About 40% of the initial protein concentrate was extracted.

The resulting extract, having a concentration of about 3% w/v protein, was diluted with cold (10° C.) tap water in a ratio of 1 part of extract to 4 parts of water, causing the immediate formation of a white cloud of protein micelles, which were allowed to settle. After centrifuging for 10 minutes, a highly viscous gelatinous mass of protein miscelles was recovered.

EXAMPLE 2

This Example illustrates the formation of buffered dry protein compositions and the formation of protein dispersions therefrom.

About 0.1% by weight of a mixture containing equal parts by weight of sodium hexametaphosphate and tetrasodium pyrophosphate was uniformly mixed with wet peanut PMM formed by the procedure of Example 1. The resulting mixture was spray dried to a powder.

Various quantities of the buffered dried PMM powder may be dispersed by simple stirring in water and the stability of the resulting aqueous dispersion tested. The stability was tested by allowing samples to stand at refrigeration temperature (about 5° to 10° C.) for about 24 hours, and by subjecting samples at room temperature (about 20° to 25° C.) to centrifugation at 200Xg. The sediment volume was measured for each sample and the observed total sediment volume in all cases of less than 1% was considred indicative of a stable product.

Dispersions were formed at concentrations of buffered PMM of 4%, 8%, 12% and 18% w/v and each was found to be stable. The pH was about 7.1 in each case and the compositions were found to have an acceptable taste by a panel of tasters and did not exhibit any of the adverse taste characteristics of soy-based products.

The viscosity was tested for each concentration and compared with cow's milk and water. The test results are reproduced in the following Table I:

TABLE I

| Product Tested | Viscosity Brookfield Units(25° C.)* |
|---|---|
| 4% PMM | 1.5 |
| 8% PMM | 1.8 |
| 12% PMM | 2.0 |
| 18% PMM | 3.0 |
| Cow's milk (2%) | 2.5 |
| Water | 1.4 |

*As determined on a Brookfield Viscometer Model HAT using Spindle No. 2 at 100 rpm.

Buffered samples of dry PMM from fababeans, field peas and soy beans were also prepared following the procedure outlined in this Example using the same buffer mixture. In each case, aqueous dispersions were formed from the buffered samples and the properties of those dispersions with respect to stability, taste and viscosity were very similar to those obtained for the peanut PMM.

EXAMPLE 3

Example 2 was repeated for buffered samples of dry PMM from peanuts, fababeans, field peas and soy beans using a buffer mixture of disodium phosphate and tetrasodium pyrophosphate in place of that recited in Example 2.

In each case dispersions in water were formed from the buffered samples and the properties of the dispersions with respect to stability, taste and viscosity were very similar to the results observed in Example 2.

EXAMPLE 4

This example illustrates an alternative method of forming buffered dry protein compositions and the formation of protein dispersions therefrom.

Dry peanut PMM was made by spray drying the wet PMM formed by the procedure of Example 1. About 0.1% by weight of a mixture containing equal parts by weight of sodium hexametaphosphate and tetrasodium pyrophosphate was dry mixed with the dry PPM.

Sufficient quantity of this mixture was dispersed by simple stirring in water to provide a protein concentration of about 8% w/v. The stability of the resulting aqueous dispersion was tested following the procedure set forth in Example 2 and the composition was found to be stable. The pH was about 7.1 and the composition was found to have an acceptable taste by a panel of tasters.

EXAMPLE 5

This Example illustrates the use of buffered dried PMM in hot beverage systems.

100 ml volumes of various water-based hot beverages were made up and about 4% w/v of buffered peanut PMM, prepared as outlined in Example 2, was included in each beverage. In each case, the system remained stable against protein separation during the consumption time of the hot beverage.

The following Table II reproduces the hot beverages tested:

TABLE II

| Base Material in 100 ml volume | Quantity |
|---|---|
| Tea | As made up |
| Cereal-based beverage | 0.6 g |
| Soup base | 2 to 2.5 g |
| Extended coffee | 1.2 g |
| Hot Chocolate | 1.4 g cocoa |

EXAMPLE 6

This Example illustrates the formation of flavored cold beverage systems from the buffered dry protein compositions outlined in Example 2.

A number of beverages were made with water from the buffered dry PMM compositions of Example 2 formed from peanuts, soy beans and fababeans. In each case, the beverage was found to be stable and to have a pleasing taste. The following Table III reproduces the cold beverage systems made up:

TABLE III

| Beverage Type | Components | % w/v |
|---|---|---|
| Vanilla Beverage | Vanillin | 0.05% |
|  | Sugar | 5.0% |
|  | PMM | 4.0% |
| Grape Beverage | Grape flavor | 0.04% |
|  | Sugar | 5.0% |
|  | PMM | 4.0% |
|  | Colour | 0.004% |
| Raspberry Beverage | Raspberry Flavor | 0.08% |
|  | Sugar | 5.0% |
|  | PMM | 4.0% |
|  | Colour | 0.004% |

The above Examples illustrate that various stable protein fortified beverages, both hot and cold, may be provided using protein micellar mass. High concentrations of protein are possible with low viscosity and good taste characteristics.

The embodiments of the invention in which an exclusive property or privilege is claimed are defined as follows:

1. A process for the production of a dry protein composition capable of rapid dispersion in water to provide a stable protein dispersion having a pH greater than about 6.2 and up to a pH of about 8.0, said process comprising:
   (a) extracting protein from a protein source material with an aqueous food grade salt solution at a temperature of about 15° to about 35° C, a salt concentration of about 0.2 to about 0.8 ionic strength and a pH of about 5.5 to about 6.5,
   (b) diluting the resulting protein solution to an ionic strength of less than about 0.1 to form an aqueous dispersion of protein micelles consisting of amphiphilic protein moieties,
   (c) settling the solid phase from said aqueous dispersion to form a protein micellar mass,
   (d) separating said settled protein micellar mass from the residual aqueous phase,
   (e) homogeneously mixing said separated protein micellar mass with sufficient at least one food grade buffering agent to provide on dispersion in water said stable protein dispersion having a pH of about 6.2 to about 8.0, and
   (f) drying the resulting homogeneous mixture to a powder.

2. The process of claim 1 wherein said extraction is effected for about 10 to about 60 minutes.

3. The process of claim 1, wherein said protein is selected from the group consisting of plant proteins, animal proteins and microbial proteins.

4. The process of claim 1, wherein said protein is selected from the group consisting of starchy cereals, starchy legumes and oil seeds.

5. The process of claim 1, wherein said protein micellar mass forms one component of the buffering system and one additional buffering agent only is homogeneously mixed therewith.

6. The process of claim 1, wherein said protein micellar mass forms one component of the buffering system and a two-component buffering agent is homogeneously mixed therewith.

7. The process of claim 1, including incorporating at least one or more flavoring agents, coloring agents and/or sweeteners into said dried composition.

* * * * *